C. G. MACHT.
CHILDREN'S CARRIAGES.

No. 182,207. Patented Sept. 12, 1876.

Witnesses.
Robt. E. Miller
Hugo Brüggemann

Inventor.
Carl G. Macht
per
Van Santvoord & Hauff
his Attorneys.

UNITED STATES PATENT OFFICE.

CARL G. MACHT, OF NEW YORK N. Y., ASSIGNOR TO HIMSELF AND GEORGE A. MEIERS, OF SAME PLACE.

IMPROVEMENT IN CHILDREN'S CARRIAGES.

Specification forming part of Letters Patent No. 182,207, dated September 12, 1876; application filed February 19, 1876.

*To all whom it may concern:*

Be it known that I, CARL G. MACHT, of the city, county, and State of New York, have invented a new and useful Improvement in Folding Carriages, which improvement is fully set forth in the following specification, reference being had to the accompanying drawing, in which—

Figure 1:
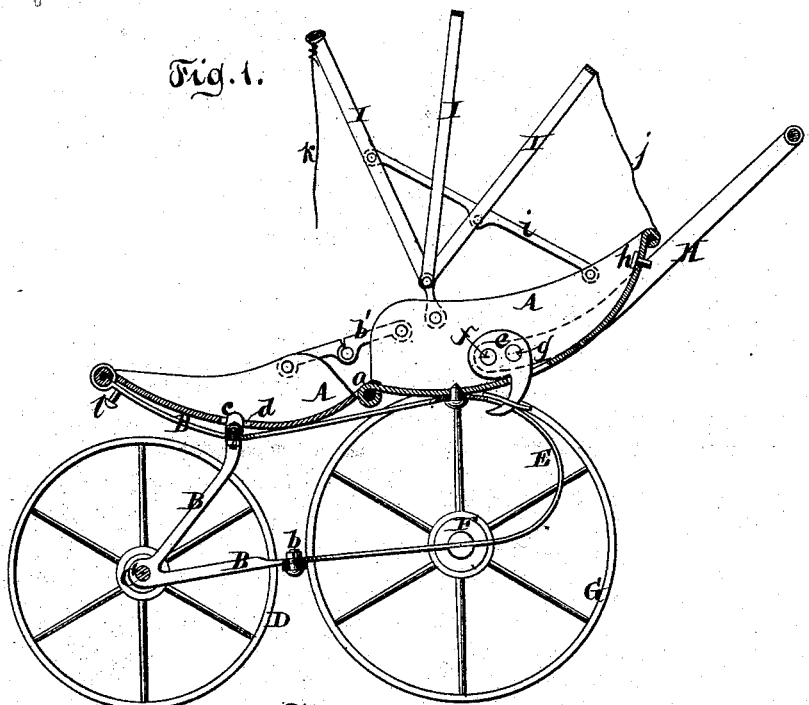
Figure 2:
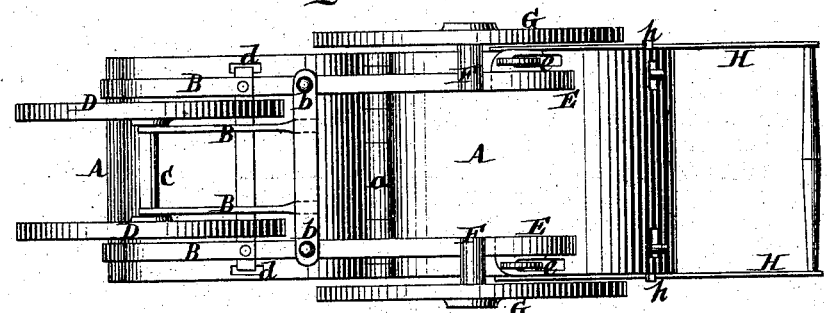
Figure 3:
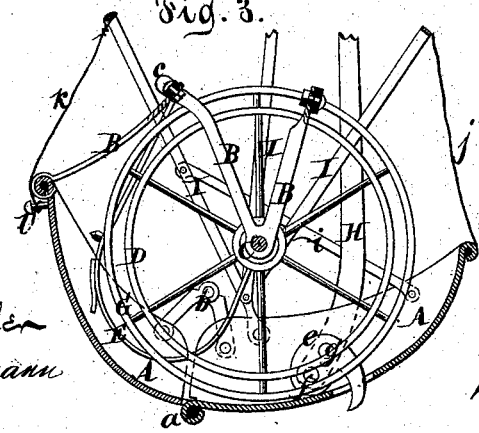

Figure 1 represents a longitudinal vertical section of my carriage when the same is unfolded ready for use, Fig. 2 is an inverted plan of the same. Fig. 3 is a longitudinal vertical section of the same when folded.

Similar letters indicate corresponding parts.

This invention relates to certain improvements in that class of carriages which can be folded for transportation, and unfolded for use.

My improvements consist in the combination, with a carriage-body, of a truck composed of a frame, which is hinged to the body and forms the bearings for the axle of the front wheels, and to which are pivoted two arms, which form the bearings for the axles of the hind wheels, so that when the carriage is to be used the frame of the front wheels can be swung down to support the front part of the body, and the arms of the hind wheels can be turned under the rear portion of the body, and when the carriage is to be folded up for transportation, the truck, together with all the wheels, can be turned up into the body. When the carriage is unfolded, the hinged arms of the hind wheels are locked in position by hooks or other suitable catches, which are operated by means of the push-handle of my carriage. This push-handle is hinged to the body, and when the carriage is unfolded for use it is retained in position by bolts attached to the back of the body, and when the carriage is folded for transportation said handle forms a bail, by means of which the carriage can be carried with convenience.

In the drawing, the letter A designates the body of my carriage, which is made in two sections, connected by a hinge-joint, *a*, and which is provided with hinged braces *b'*, by means of which said body, when unfolded, can be rendered rigid. The truck of my carriage is composed of a frame, B, which is hinged to the front end of the body, and which forms the bearings for the axle C of the front wheels D. Said frame is provided with lips *c*, which, when the carriage is unfolded for use, catch in mortises *d* in the bottom of the body A.

With the frame B are combined two arms, E, which are bent in the form of C-springs, and which are connected to the frame by pivots *b*, so that they can be swung out to the position shown in Fig. 3, or that they can be turned beneath the body A to the position shown in Figs. 1 and 2. In this latter position said arms are locked to the body by means of hooks *e*, or by any other suitable fastenings. Each of the arms E forms the bearing for an axle, F, and on these axles are mounted the hind wheels G.

The letter H designates the push-handle, which is connected to the body A by pivots *f*. The hooks *e* turn on these pivots, and they are connected by rivets *g* with the arms of the push-handle, said rivets passing through curved slots in the sides of the body A, so that when the handle is turned up to the position shown in Fig. 3 the hooks are drawn in, and when the handle is depressed to the position shown in Fig. 1 the hooks are turned down in position to engage with the hinged arms E of the hind wheels. The rivets also form stops, to prevent the handle from turning up beyond the desired point, and to impart to the same a certain degree of stability in carrying the carriage. It is obvious that for the hooks *e* other devices, such as slides or latches, might be substituted. When the handle is depressed to the position shown in Fig. 1, it is retained in position by the combined action of the hooks *e* and of bolts *h*, which slide on the back of the body A. With the body A is combined a top, I, composed of three or more bows, which, when the carriage is unfolded, can be turned up over the rear portion of the body and retained in position by hinged braces *i*, and cords or ropes *j*. To the front bow are attached loops *k*, which, when the carriage is folded, are made to catch over buttons *l*, secured to the front bar of the body A.

What I claim as new, and desire to secure by Letters Patent, is—

1. The combination, with a carriage-body, A, of a truck composed of a frame, B, which is hinged to the front part of the body, and forms the bearings for the front axle, and of hinged arms E, which form the bearings for the hind axles, the whole being constructed and operating substantially as shown and described.

2. The combination of the body A, hinged frame B, hinged arms E, push-handle H, and hooks e, or other equivalent fastenings, whereby the truck is locked, when the push-handle is depressed substantially as set forth.

3. The combination of the body A, handle H, hinged frame B, hinged arms E, hooks e, and bolts h, substantially as shown and described.

In testimony that I claim the foregoing I have hereunto set my hand and seal this 14th day of February, 1876.

CARL G. MACHT. [L. S.]

Witnesses:
W. HAUFF,
E. F. KASTENHUBER.